(12) United States Patent
Sinha et al.

(10) Patent No.: US 8,832,723 B2
(45) Date of Patent: Sep. 9, 2014

(54) METHOD AND SYSTEM FOR A SYNCHRONOUS EVENT MANAGER FOR AUTOMATIC CONTENT RECOGNITION

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 13/730,754

(22) Filed: Dec. 28, 2012

(65) Prior Publication Data

US 2013/0205323 A1  Aug. 8, 2013

Related U.S. Application Data

(60) Provisional application No. 61/596,012, filed on Feb. 7, 2012.

(51) Int. Cl.
*H04H 60/32* (2008.01)
*H04N 21/81* (2011.01)
*G06F 3/0484* (2013.01)
*H04N 21/478* (2011.01)
*H04N 21/442* (2011.01)
*G06F 17/30* (2006.01)
*H04N 21/441* (2011.01)
*H04N 21/44* (2011.01)
*H04N 21/00* (2011.01)
*H04N 21/435* (2011.01)
*H04N 21/4722* (2011.01)
*H04N 21/4784* (2011.01)
*G06T 1/00* (2006.01)

(52) U.S. Cl.
CPC ....... *H04N 21/44008* (2013.01); *H04N 21/812* (2013.01); *G06F 3/0484* (2013.01); *H04N 21/478* (2013.01); *H04N 21/442* (2013.01); *G06F 17/30495* (2013.01); *H04N 21/441* (2013.01); *H04N 21/00* (2013.01); *H04N 21/435* (2013.01); *H04N 21/4722* (2013.01); *H04N 21/4784* (2013.01); *G06T 1/0021* (2013.01)
USPC .......................................... 725/19; 725/141

(58) Field of Classification Search
CPC ...................................................... H04N 21/44
USPC .................................................... 725/19, 141
See application file for complete search history.

(56) References Cited

U.S. PATENT DOCUMENTS

| | | |
|---|---|---|
| 5,437,050 A | 7/1995 | Lamb et al. |
| 5,874,686 A | 2/1999 | Ghias et al. |
| 5,918,223 A | 6/1999 | Blum et al. |
| 5,956,683 A | 9/1999 | Jacobs et al. |
| 5,991,737 A | 11/1999 | Chen |
| 6,121,530 A | 9/2000 | Sonoda |
| 6,201,176 B1 | 3/2001 | Yourlo |
| 6,314,577 B1 | 11/2001 | Pocock |
| 6,408,272 B1 | 6/2002 | White et al. |
| 6,504,089 B1 | 1/2003 | Negishi et al. |
| 6,556,218 B1 | 4/2003 | Alcorn |
| 6,760,720 B1 | 7/2004 | De Bellis |
| 6,765,595 B2 | 7/2004 | Lee et al. |
| 6,834,308 B1 | 12/2004 | Ikezoye et al. |
| 6,968,337 B2 | 11/2005 | Wold |
| 6,990,453 B2 | 1/2006 | Wang et al. |
| 7,080,325 B2 | 7/2006 | Treibach-Heck et al. |
| 7,174,293 B2 | 2/2007 | Kenyon et al. |
| 7,190,971 B1 | 3/2007 | Kawamoto |
| 7,194,752 B1 | 3/2007 | Kenyon et al. |
| 7,266,343 B1 | 9/2007 | Yli-juuti et al. |
| 7,363,278 B2 | 4/2008 | Schmelzer et al. |
| 7,444,353 B1 | 10/2008 | Chen et al. |
| 7,500,007 B2 | 3/2009 | Ikezoye et al. |
| 7,529,659 B2 | 5/2009 | Wold |
| 7,562,012 B1 | 7/2009 | Wold et al. |
| 7,562,392 B1 | 7/2009 | Rhoads et al. |
| 7,565,327 B2 | 7/2009 | Schmelzer |
| 7,707,088 B2 | 4/2010 | Schmelzer |
| 7,711,652 B2 | 5/2010 | Schmelzer |
| 7,783,489 B2 | 8/2010 | Kenyon et al. |

| | | |
|---|---|---|
| 7,797,249 B2 | 9/2010 | Schmelzer et al. |
| 7,870,574 B2 | 1/2011 | Kenyon et al. |
| 7,877,438 B2 | 1/2011 | Schrempp et al. |
| 7,917,645 B2 | 3/2011 | Ikezoye et al. |
| 2002/0083060 A1 | 6/2002 | Wang et al. |
| 2003/0055699 A1 | 3/2003 | O'Connor |
| 2008/0310731 A1 | 12/2008 | Stojancic et al. |
| 2008/0313140 A1 | 12/2008 | Pereira et al. |
| 2010/0007797 A1 | 1/2010 | Stojancic |
| 2010/0205628 A1* | 8/2010 | Davis et al. ............... 725/25 |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2011/0177775 A1* | 7/2011 | Gupta et al. ............ 455/3.06 |
| 2013/0047178 A1* | 2/2013 | Moon et al. ............... 725/25 |
| 2013/0047180 A1* | 2/2013 | Moon et al. ............... 725/30 |
| 2013/0239163 A1* | 9/2013 | Kim et al. ............... 725/115 |

FOREIGN PATENT DOCUMENTS

| | | |
|---|---|---|
| EP | 1485815 | 10/2007 |
| EP | 1354276 | 12/2007 |
| JP | 11055201 | 2/1999 |
| WO | WO9517746 | 6/1995 |

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.

Blackburn, Steven G., "Search by Humming," University of Southampton Faculty of Engineering, Department of Electronics and Computer Science, May 8, 1997.

Ghias, Asif et al., "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call *CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

\* cited by examiner

*Primary Examiner* — Mark D Featherstone
*Assistant Examiner* — Michael M Nguyen
(74) *Attorney, Agent, or Firm* — Arent Fox LLP

(57) ABSTRACT

A method and system for a synchronous event manager for automatic content recognition (ACR) are described. A display device, such as a connected television or mobile device, may be operable to perform ACR and may utilize a synchronous event manager comprising a software layer that may continuously be executed as a background process. The software layer may comprise a single framework or framework from which to execute one or more user-interaction applications. The software layer may monitor internal and external events and may detect an event trigger produced in response to a match resulting from the ACR. After receiving a user-interaction application corresponding to the detected event trigger, the software layer may launch or invoke the user-interaction application from the single framework. In some instances, multiple user-interaction applications may be launched concurrently from the single framework. These user-interaction applications may interface with each other through the single framework.

32 Claims, 11 Drawing Sheets

METHOD AND SYSTEM FOR A SYNCHRONOUS EVENT MANAGER FOR AUTOMATIC CONTENT RECOGNITION

CROSS-REFERENCE TO RELATED APPLICATIONS/INCORPORATION BY REFERENCE

This application makes reference to, claims priority to, and claims the benefit of U.S. provisional application 61/596,012, filed on Feb. 7, 2012.
U.S. patent application Ser. No. 13/730,359 filed on Dec. 28, 2012;
U.S. patent application Ser. No. 13/730,422 filed on Dec. 28, 2012;
U.S. patent application Ser. No. 13/730,459 filed on Dec. 28, 2012;
U.S. patent application Ser. No. 13/730,495 filed on Dec. 28, 2012;
U.S. patent application Ser. No. 13/730,530 filed on Dec. 28, 2012;
U.S. patent application Ser. No. 13/730,559 filed on Dec. 28, 2012;
U.S. patent application Ser. No. 13/730,579 filed on Dec. 28, 2012;
U.S. patent application Ser. No. 13/730,593 filed on Dec. 28, 2012;
U.S. patent application Ser. No. 13/730,759 filed on Dec. 28, 2012;
U.S. patent application Ser. No. 13/730,627 filed on Dec. 28, 2012;
U.S. patent application Ser. No. 13/730,644 filed on Dec. 28, 2012;
U.S. patent application Ser. No. 13/730,656 filed on Dec. 28, 2012;
U.S. patent application Ser. No. 13/730,670 filed on Dec. 28, 2012;
U.S. patent application Ser. No. 13/730,691 filed on Dec. 28, 2012;
U.S. patent application Ser. No. 13/730,702 filed on Dec. 28, 2012;
U.S. patent application Ser. No. 13/730,718 filed on Dec. 28, 2012; and
U.S. patent application Ser. No. 13/730,734 filed on Dec. 28, 2012.

Each of the above referenced applications is hereby incorporated herein by reference in its entirety.

FIELD OF TECHNOLOGY

Certain embodiments of the invention relate to digital audio/video content recognition. More specifically, certain embodiments of the invention relate to a method and system for a synchronous event manager for automatic content recognition.

BACKGROUND

Smart or connected televisions (TVs) may receive data from data networks that allow a viewer to not only access broadcast digital content, but to also receive multimedia content.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a synchronous event manager for automatic content recognition, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
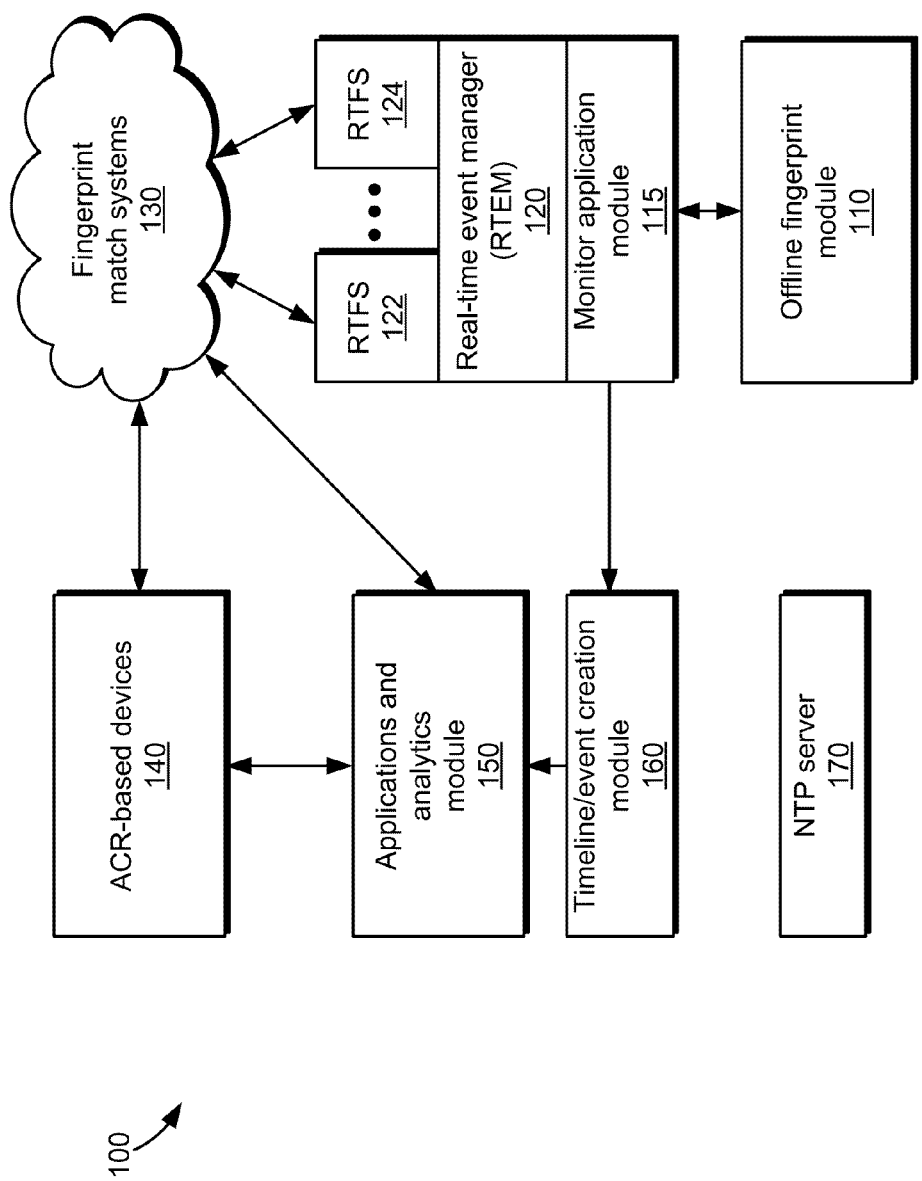
FIG. 1 is a high-level block diagram that illustrates an exemplary automatic content recognition system in which end-user devices utilize a synchronous event manager for automatic content recognition, in accordance with an embodiment of the invention.

Certain embodiments of the invention may be found in a method and system for a synchronous event manager for automatic content recognition (ACR). Various embodiments of the invention provide a display device, such as a connected television (TV) or mobile device, for example, which may be utilized with an ACR system. The display device may be operable to perform ACR and may utilize a synchronous event manager comprising a software layer that is continuously executed. In one aspect of the invention, the software layer may run as a background process. The software layer may comprise a single environment or framework from which to execute one or more applications that enable a user to engage in interactive events with the display device. The software layer may monitor internal and external events and may detect an event trigger produced in response to a match resulting from the ACR. After receiving a user-interaction application corresponding to the detected event trigger, the software layer may launch or invoke the user-interaction application from the single framework. In some instances, multiple user-interaction applications may be executed concurrently from the single framework. Moreover, these user-interaction applications may interface with each other through the single environment or framework. The request and/or launching of the user-interaction applications may occur through the synchronous event manager and are transparent to the user. In this regard, the operation of the synchronous event manager is transparent to the user.

The ACR system in which end-user devices such as display devices utilize a synchronous event manager to monitor events may be implemented with a single network time server that coordinates the triggering of events. The ACR system may also comprise multiple fingerprint servers, each of which utilizes different fingerprinting technology. The network time server may also be referred to as a network protocol time (NTP) server. Each of the fingerprint servers may generate a set of video fingerprints in real time from a network television feed by utilizing a video fingerprint technology that is different from the technology utilized by any of the other fingerprint servers. The different fingerprinting technologies may be from different fingerprinting vendors, for example. The fingerprint servers may also be referred to as real-time fingerprint servers (RTFSs). The network time server may be operable to assign one or more interactive event identifiers to the different sets of video fingerprints generated by the fingerprint servers. The fingerprint servers may communicate the sets of video fingerprints and interactive event identifiers to corresponding fingerprint match systems, which in turn may communicate with end-user devices that utilize the same video fingerprint technology as the corresponding fingerprint server.

Fingerprinting, and more particularly ACR fingerprinting, may refer to a process by which features of a video frame and/or of an audio frame may be analyzed to create representations (i.e., fingerprints) for each piece of content, for example. The fingerprints may be unique to each piece or sequence of content and may be highly robust against broadcast distortions such as re-encoding, aspect ratio, frame rate, up/down conversion, and pitch correction, to name a few. The fingerprints may be stored in a reference database in the ACR system such that unidentified content (e.g., content from a network television feed) may be identified by comparing fingerprints taken of the unidentified content with the stored fingerprints.

Once the interactive event identifiers have been assigned by the network time protocol server, the real-time fingerprint servers may communicate the video fingerprints and the assigned event identifiers to corresponding fingerprint match systems. In some instances, the fingerprint match systems may be operated by a third party (e.g., television manufacturers, vendors etc.) as hosted services over the Internet (e.g., cloud computing, etc.). Each of the fingerprint match systems may communicate with end-user devices (e.g., connected TVs, tablets, smartphones, etc.) that utilize the same video fingerprint technology utilized by the fingerprint server that corresponds to that fingerprint match system. The end-user devices may be referred to as viewer devices, for example. The end-user devices may utilize the synchronous event manager to monitor and manage internal events corresponding to ACR operations and/or external events such as event triggers in the form of interactive event identifiers, for example.

The fingerprint match systems receive video fingerprints from the end-user devices and compare them to the ones received from the real-time fingerprint servers. When a match occurs, the fingerprint match systems may notify the end-user devices that an interactive event is to take place if there is an event identifier that corresponds to the matched video fingerprints. The synchronous event manager in each of the end-user devices monitors and manages signals and/or notifications related to the ACR-related operations of the device, including but not limited to notifications that an interactive event is to take place.

As described above, automatic content recognition may be utilized across several platforms, including connected TVs from various manufacturers as well as smartphones and tablets. Since television viewing may be rapidly evolving from a single-screen experience to a multiple-screen experience, television networks may need to automatically identify the context of what a viewer is watching and the time in the program, both during a live television broadcast and in subsequent viewings such as when a program is being reproduced by a digital video recorder (DVR). In multi-screen viewing experiences, for example, companion applications on second-screen devices may also be utilized to interact with the television programming.

Having the ability to identify context and program timing may enable a network to increase audience engagement, extend viewing times, and provide program sponsors additional ways to engage with the audience, such as offering viewers personalized advertising offers or creating a second-screen experience during an advertisement break. These features may be implemented by having a central video fingerprint repository and management platform that facilitates triggering interactive events across various platforms regardless of the ACR vendor solution (e.g., fingerprinting technology). For example, an ACR system may utilize a single broadcast ACR solution to support connected TVs from multiple vendors as well as second-screen devices running companion applications. In this regard, connected TVs from a particular vendor may utilize a synchronous event manager with functionality and/or interfaces that are suitable for those connected TVs. An ACR system supporting multiple vendors may be scalable and additional ACR vendor solutions may be easily added without architectural changes. Moreover, such a system may handle both real-time and pre-recorded (offline) content.

Below are described various examples of aspects related to an ACR system in which end-user devices utilize a synchronous event manager. These exemplary aspects may comprise the system architecture, processes, application programming interfaces (APIs), and/or web-based services.

FIG. 1 is a high-level block diagram that illustrates an exemplary automatic content recognition system in which end-user devices utilize a synchronous event manager for automatic content recognition, in accordance with an embodiment of the invention. Referring to FIG. 1, there is shown an ACR system 100 that supports fingerprinting technology from multiple vendors. The ACR system 100 may comprise an offline fingerprint module 110, a monitor application module 115, a real-time event manager (RTEM) 120, a plurality of RTFSs 122, . . . , 124, fingerprint match systems 130, end-user devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, . . . , 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 . . . 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the Real-time event manager 120 may be operable to generate one or more signals that provide instructions to the RTFSs 122, . . . , 124 to enable the identification of a network television station based on the logo, symbol, sign, watermark, and/or text that are typically utilized to represent the network television station. The instructions may be related to information that is to be generated and/or provided to the end-user devices 140 for network television station identification. The instructions may indicate the type of information that is to be provided to the end-user devices 140 and/or when such information is to be provided. In some instances, a portion of the ACR system 100 other than the Real-time event manager 120, or in conjunction with the Real-time event manager 120, may generate the signals for providing instructions to the RTFSs 122, . . . , 124.

The RTFSs 122, . . . , 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, . . . , 124 may be a dedicated server for each of the fingerprint technologies supported by the ACR system 100. In some embodiments of the invention, a portion of the RTFSs 122, . . . , 124 may be operable to perform video fingerprinting while the remaining portion of the RTFSs 122, . . . , 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the RTFSs 122, . . . , 124 may be operable to receive one or more signals from the Real-time event manager 120 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 140 to take fingerprints of the video content being displayed on a viewing screen. In some instances, at least a portion of the fingerprinting locations may be provided by the Real-time event manager 120 and/or by another portion of the ACR system 100 through the instructions received by the RTFSs 122, . . . , 124. In other instances, the fingerprinting locations may be determined by the RTFSs 122, . . . , 124 based on locally and/or remotely stored information. Each fingerprinting location may comprise coordinates in a video frame (e.g., x coordinates, y coordinates) that indicate a particular region in the video frame to fingerprint.

The RTFSs 122, . . . , 124 may provide the fingerprinting locations for communication to the end-user devices 140, for example, in the form of fingerprint profiles. The fingerprint profiles may comprise fingerprinting locations and/or other information to be utilized by an end-user device for ACR fingerprinting. In some instances, the fingerprint profiles may be generated by the RTFSs 122, . . . , 124 in response to the instructions received. In other instances, the fingerprint profiles comprising the fingerprinting locations may be received by the RTFSs 122, . . . , 124 from the Real-time event manager 120 and/or from another portion of the ACR system 100. The fingerprint profile of a particular end-user device 140 may be updated based on an indication that additional and/or different locations may be needed during fingerprinting to identify the network television station logo or symbol being displayed on a viewing screen at the end-user device 140. The update may be generated by the corresponding RTFS and then communicated to the end-user device 140 or may be received by the corresponding RTFS from the Real-time event manager 120 and/or from another portion of the ACR system 100 and then communicated to the end-user device 140.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 140. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the RTFSs 122, . . . , 124 may be operable to communicate fingerprint profiles and/or fingerprint profile updates to the end-user devices 140 through the fingerprint match systems 130. Feedback and/or queries from the end-user devices 140 may be received by the RTFSs 122, . . . , 124 for processing. The RTFSs 122, . . . , 124 may in turn communicate information corresponding to the feedback and/or queries from the end-user devices 140 to the Real-time event manager 120 and/or to another portion of the ACR system 100 for further processing.

The fingerprint match systems 130 may comprise suitable logic, circuitry, code, and/or interfaces that may be operable to enable hosted services in the Internet for matching fingerprints produced by the RTFSs 122, . . . , 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, . . . , 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

The end-user devices 140 may be operable to execute or run a synchronous event manager as a background process. The synchronous event manager may comprise a software layer that monitors events and is enabled to receive event triggers and associated data when there is a fingerprint match that results in an interactive event. The execution of the synchronous event manager may be performed continuously, at least for a period of time during which the event monitoring is to take place. The events monitored may comprise events that occur in connection with the internal ACR operations of the device, for example, and events provided by external sources, such as the event triggers and associated data, for example.

In some instances, the synchronous event manager in an end-user device 140 may be enabled to determine whether the user has elected to participate in events corresponding to a particular network television station. When such election has been made, the synchronous event manager may enable or allow applications related to the interactive event to be requested and/or launched. The synchronous event manager may enable the event trigger and associated data to interface with a framework, environment, or engine of the software layer.

The fingerprint match systems 130 may comprise suitable logic, circuitry, code, and/or interfaces that may be operable to enable hosted services in the Internet for matching fingerprints produced by the RTFSs 122, . . . , 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, . . . , 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

The applications and analytics module 150 may comprise suitable logic, circuitry, code, and/or interfaces that may be operable to provide data to the end-user devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate End-user devices 140 that may not support event-to-fingerprint association. Once the End-user devices 140 have the timeline for a particular program or show, they may monitor the program or show, relative to the timeline, and launch appropriate event requests when a specified point in the timeline indicates that a particular event is to take place.

Communication between the RTFSs 122, . . . , 124, and the fingerprint match systems 130 may occur through one or more wireless and/or wireline communication links. Similarly, communications between the fingerprint match systems 130 and the end-user devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, . . . , 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, . . . , 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, . . . , 124 may communicate the event identifiers and the fingerprints to its corresponding one of the fingerprint match systems 130. The fingerprint match systems 130 in turn receive fingerprints from their corresponding end-user devices 140 and try to match those fingerprints to the ones received from their corresponding RTFSs 122, . . . , 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event.

In instances when the match occurs and the event identifier and/or other information may be passed to the appropriate end-user device, the information passed may be monitored and handled by a synchronous event manager running in the end-user device. The synchronous event manager may utilize the information to obtain graphics or other interactive information from the applications and analytics module 150. The interactive information may be provided in the form of a user-interactive application, for example, which is executed in a portion of the synchronous event manager configured to handle the user-interactive application.

In operation, the ACR system 100 may generate a fingerprint profile that may be communicated to one of the end-user devices 140. The fingerprint profile may be communicated through one or more of the Real-time event manager 120, one of the RTFSs 122, . . . , 124, and one of the fingerprint match systems 130. The fingerprint profile may comprise locations where the end-user device is to take fingerprints of the video content being reproduced by the device. Once the content is identified based on the fingerprints taken and subsequently matched in the corresponding fingerprint match system 130, it may be determined that the source of the content is not known. Knowing the source of the content may be needed in some instances to enable interactive events associated with that source on the end-user device. Otherwise, an interactive event from, for example, one network television station may occur when a viewer is watching programming provided by a different network television station.

When the source of the content is not known, the end-user device may automatically utilize additional locations provided in the fingerprint profile or in a fingerprint profile update. These locations may correspond to the region in the video frame where the network television station logo or symbol is typically placed. Once these fingerprints are taken, they may be compared to fingerprints of the network television station logo or symbol at the corresponding fingerprint match systems 130. When a match occurs and the logo is identified, the end-user device may be able to receive interactive event identifiers from the corresponding RTFS. Once these interactive event identifiers are received, the end-user device may communicate with the applications and analytics module 150 to enable the interactive events to occur.

Figure 2A:
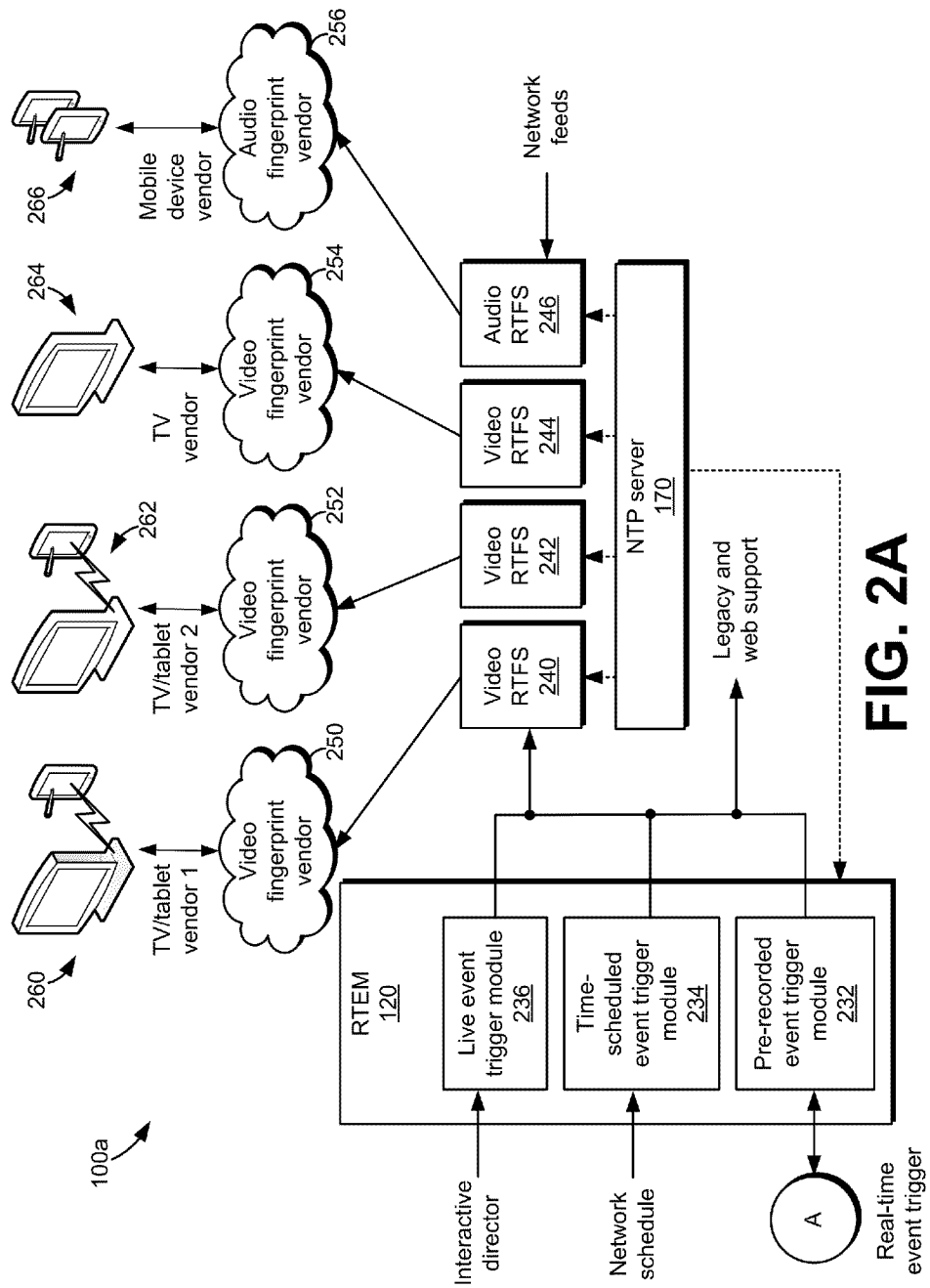
FIGS. 2A and 2B are each a block diagram that illustrates details of the exemplary automatic content recognition system shown in FIG. 1, in accordance with embodiments of the invention.
Figure 2B:
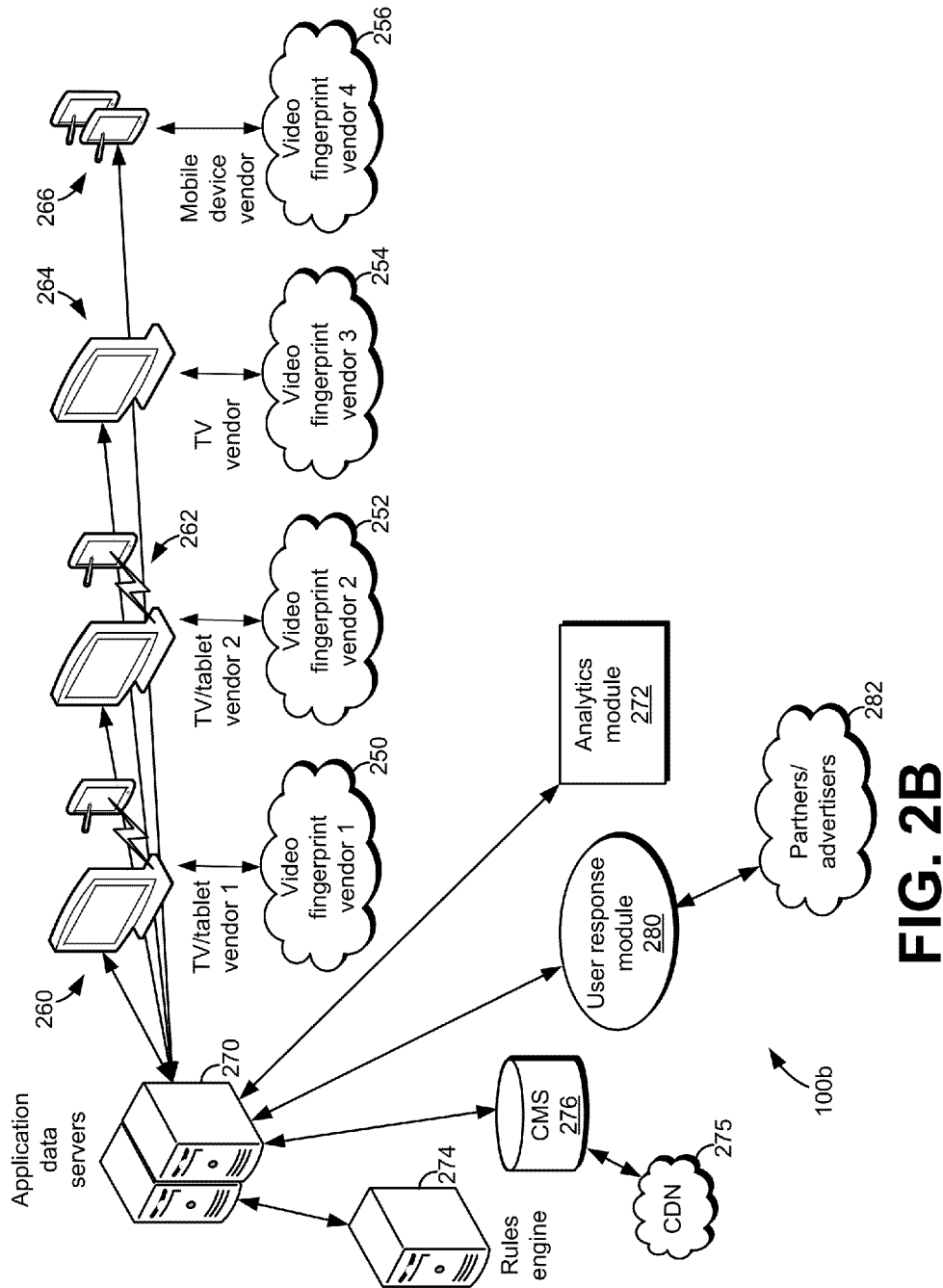

FIGS. 2A and 2B are each a block diagram that illustrate details of the exemplary automatic content recognition system shown in FIG. 1, in accordance with embodiments of the invention. Referring to FIG. 2A, there is shown a portion 100a of the ACR system 100 shown above with respect to FIG. 1 that may comprise the RTEM 230, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2A are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2A. The NTP server 170 of FIG. 1 is shown providing reference timing to the RTEM 230 and the RTFSs 240, 242, 244, and 246.

Also shown in FIG. 2A are various end-user devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example.

The end-user devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the end-user devices 260. These services may comprise video fingerprint matching as well as the delivery of any interactive event IDs associated with a match. The services may also comprise the communication of fingerprint profiles and/or other related information to the end-user devices 260 and/or the reception of feedback and/or queries from the end-user devices 260 to be communicated to the video RTFS 240. In addition, the video fingerprint vendor 250 may provide a network television station identifier and/or network timing information (e.g., heartbeat message or NTP-based network timestamp) that may be utilized by the end-user devices 260 for ACR-related applications and/or to maintain synchronization with the network television feed.

The end-user devices 260 may comprise suitable logic, circuitry, code, and/or interfaces that may be operable to take and send video fingerprints to the video fingerprint vendor 250 for matching. Moreover, each of the end-user devices 260 may be operable to run or execute a synchronous event manager continuously as a background software operation to monitor events and handle applications related to interactive opportunities to be presented to users. The synchronous event manager may be operable to receive and process information from a corresponding video fingerprint vendor 250.

The end-user devices 262 may be operable to utilize the same video fingerprinting technology utilized by the video RTFS 242 and supported by the video fingerprint vendor 252. The video fingerprinting technology utilized by the end-user devices 262 may be different from that utilized by the end-user devices 260. The video fingerprint vendor 252 may be a vendor, manufacturer, or other third-party service provider that may comprise suitable logic, circuitry, code, and/or interfaces operable to provide hosted services over the internet for the end-user devices 262. These services may comprise video fingerprint matching as well as the delivery of any interactive event IDs associated with a match. The services may also comprise the communication of fingerprint profiles and/or other related information to the end-user devices 262 and/or the reception of feedback and/or queries from the end-user devices 262 to be communicated to the video RTFS 242. In addition, the video fingerprint vendor 252 may provide a network television station identifier and/or network timing information that may be utilized by the end-user devices 262 for ACR-related applications and/or to maintain synchronization with the network television feed. The end-user devices 262 may comprise suitable logic, circuitry, code, and/or interfaces that may be operable to take and send video fingerprints to the video fingerprint vendor 252 for matching. The end-user devices 260 and 262 may be operable with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality. Moreover, each of the end-user devices 262 may be operable to run or execute a synchronous event manager continuously as a background software operation to monitor events and handle applications related to interactive opportunities to be presented to users. The synchronous event manager may be operable to receive and process information from a corresponding video fingerprint vendor 252.

The end-user devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the end-user devices 264. These services may comprise video fingerprint matching as well as the delivery of any interactive event IDs associated with a match. In addition, the video fingerprint vendor 254 may provide a network television station identifier and/or network timing information that may be utilized by the end-user devices 264 for ACR-related applications and/or to maintain synchronization with the network television feed. The end-user devices 264 may comprise suitable logic, circuitry, code, and/or interfaces that may be operable to take and send video fingerprints to the video fingerprint vendor 254 for matching.

The end-user devices 264 may comprise suitable logic, circuitry, code, and/or interfaces that may be operable to take and send video fingerprints to the video fingerprint vendor 254 for matching. Moreover, each of the end-user devices 264 may be operable to run or execute a synchronous event manager continuously as a background software and/or firmware operation to monitor events and handle applications related to interactive opportunities to be presented to users. The synchronous event manager may be operable to receive and process information from a corresponding video fingerprint vendor 254.

The end-user devices 266 may utilize the same audio fingerprinting technology (e.g., audio ACR) utilized by the audio RTFS 246 and supported by the audio fingerprint vendor 256. The end-user devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the end-user devices 266. These services may comprise audio fingerprint matching as well as the delivery of any interactive event IDs associated with a match. The services may also comprise the communication of audio fingerprint profiles and/or other related information to the end-user devices 266 and/or the reception of feedback and/or queries from the end-user devices 266 to be communicated to the audio RTFS 246. Audio fingerprint profiles may comprise information related to the characteristics (e.g., segments, frequencies) of the audio fingerprints to be taken by the end-user devices 266. In addition, the audio fingerprint vendor 256 may provide a network television station identifier and/or network timing information that may be utilized by the end-user devices 260 for ACR-related applications and/or to maintain synchronization with the network television feed.

The end-user devices 266 may comprise suitable logic, circuitry, code, and/or interfaces that may be operable to take and send audio fingerprints to the audio fingerprint vendor 256 for matching. Moreover, each of the end-user devices 266 may be operable to run or execute a synchronous event manager continuously as a background software operation to monitor events and handle applications related to interactive opportunities to be presented to users. The synchronous event manager may be operable to receive and process information from the audio fingerprint vendor 256.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding end-user devices. The RTFSs 240, . . . , 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTFSs 240, . . . , 246 may be operable to handle instructions and/or information that enable the identification of a network television station based on the logo, symbol, sign, watermark, and/or text that are typically utilized to represent the network television station. In this regard, the RTFSs 240, . . . , 246 may be operable to handle instructions and/or information as described above with respect to the RTFSs 122, . . . , 124 that are illustrated in FIG. 1, for example.

The RTEM 230 may comprise suitable logic, circuitry, code, and/or interfaces that may be operable to perform real-time event triggering. In this regard, the RTEM 230 may be operable to manage real-time events based on inputs from different sources. For example, the RTEM 230 may comprise a pre-recorded event trigger module 232 to provide real-time triggering from the monitor application module 115 (shown in FIG. 1), a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via, for example, defined APIs to fingerprints generated as the network television feeds are fingerprinted by the RTFSs 240, . . . , 246.

The time-scheduled event trigger module 234 may be operable to receive a network or broadcast schedule and to assign, based on the network schedule, interactive events to fingerprints generated as the network television feed is fingerprinted by the RTFSs 240, . . . , 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 230 may also be operable to trigger interactive events in legacy television systems and/or in web-based systems. The infrastructure provided by the RTEM 230 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 230 may be operable to assign interactive event IDs to particular fingerprints in a sequence of audio or video fingerprints generated by the RTFSs 240, . . . , 246. The RTEM 230 may also be operable to provide television network station identifiers and/or network timing information associated with any sequence of fingerprints.

In the example shown in FIG. 2B, the RTFSs 240, . . . , 246 may correspond to the RTFSs 122, . . . , 124, the fingerprint vendors 250, . . . , 256 may correspond to the fingerprint match systems 130, and the end-user devices 260, . . . , 266 may correspond to the end-user devices 140, which are illustrated in FIG. 1.

The RTEM 230 may be operable to handle instructions and/or information that enable the identification of a network television station based on the logo, symbol, sign, watermark, and/or text that are typically utilized to represent the network television station. In this regard, the Real-time event manager 230 may be operable to handle instructions and/or information as described above with respect to the Real-time event manager 120 that is illustrated in FIG. 1, for example.

In operation, the RTEM 230 may generate and/or handle one or more interactive event IDs that correspond to a particular set of fingerprints generated by the RTFSs 240, . . . , 246. The RTEM 230 may have determined the interactive event IDs based on live event inputs, time-scheduled event inputs, and/or pre-recorded event inputs. The RTEM 230 may assign or associate the interactive event IDs to their appropriate fingerprints based on the synchronization of its operation to the operation of the RTFSs 240, . . . , 246 via broadcast NTP. The RTEM 120 may also provide television network station identifiers and/or network timing information to the RTFSs 240, . . . , 246. The RTFSs 240, . . . , 246 may communicate the fingerprints, interactive event IDs, the television network station identifiers, and/or the network timing information to their corresponding fingerprint vendors.

The client or end-user devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100a in FIG. 2A may also illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

The end-user devices may take and send fingerprints to their corresponding fingerprint vendors, which in turn determine whether there is a match with the fingerprints received from the RTFSs. Upon detection or determination of a match, the fingerprint vendors may return to the end-user device various pieces of information, including but not limited to television network station identifiers, network timing information, and any interactive event ID that is triggered as a result of the match. A synchronous event manager running in each of the end-user devices may monitor information being received from a corresponding RTFS and may process the various pieces of information described above to enable an interactive opportunity to take place.

Referring to FIG. 2B, there is shown a portion 100b of the ACR system 100 that may comprise the end-user devices 260, . . . , 266 and the fingerprint vendors 250, . . . , 256 shown in FIG. 2A. Also shown are application data servers 270, an analytics module 272, a rules engine 274, a cloud-based content delivery network (CDN) 275, and a content management system (CMS) 276. In addition, FIG. 2B shows a user response module 280 and third-party partners/advertisers 282.

The application data servers 270 may comprise suitable logic, circuitry, code, and/or interfaces that may be operable to receive from a viewer device information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page.

The content provided by the application data servers 270 may comprise user-interaction applications that may be executed by a portion of a synchronous event manager running on an end-user device. In some instances, more than one user-interaction application may be sent to the same end-user device from the application data servers 270 and these multiple applications may be executed concurrently by the end-user device.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to call the CMS 276 for text, banners, graphics, overlays, and/or video, for example.

The application data servers 270 may also be operable to deliver event schedules to end-user devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., end-user devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the end-user devices. For example, content that may be delivered may comprise text, banners, graphics, overlays, and video. The content may be provided as user-interaction applications that may be handled by a synchronous event manager running in the end-user device. Other examples of content may comprise polls and fun facts, clips to share, games and trivia, and advertising content. These examples are provided by way of illustration and not of limitation. Accordingly, other examples of contents that may be utilized for user interactive events with the end-user devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets (graphics, banners, overlays, video, etc) from the CDN 275.

The analytics module 272 may comprise suitable logic, circuitry, code, and/or interfaces that may be operable to receive user interaction information from the application data servers 270 or directly from the viewing devices. The analytics module 272 may be operable to communicate with the fingerprint vendors 250, . . . , 256 to receive information and determine what is being watched in various viewer devices or end-user devices. The analytics module 272 may comprise one or more back-end databases to store, mange, and/or process user information.

In operation, content may be provided by the application data servers 270 to one of the end-user devices 260, . . . , 266 in response to receiving an interactive event ID, a network television station, device type, and other data from that viewer device. A synchronous event manager in the end-user devices may be utilized to request the content from the application data servers 270 and to receive and/or process the content to enable interactive opportunities for a user. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on end-user devices. The advertisement servers may also be operable to support the tracking of user impressions and click-throughs and/or to perform other advertising-related functions.

The ACR system 100 may communicate with one or more advertisement servers and/or one or more fulfillment systems. The advertisement servers may be utilized to deliver advertisement overlays to ACR-based applications running on end-user devices. In this regard, a synchronous event manager running on an end-user device may be operable to handle information received from the advertisement servers. The advertisement servers may also be operable to support the tracking of user impressions and click-throughs and/or to perform other advertising-related functions.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways.

Figure 3A:
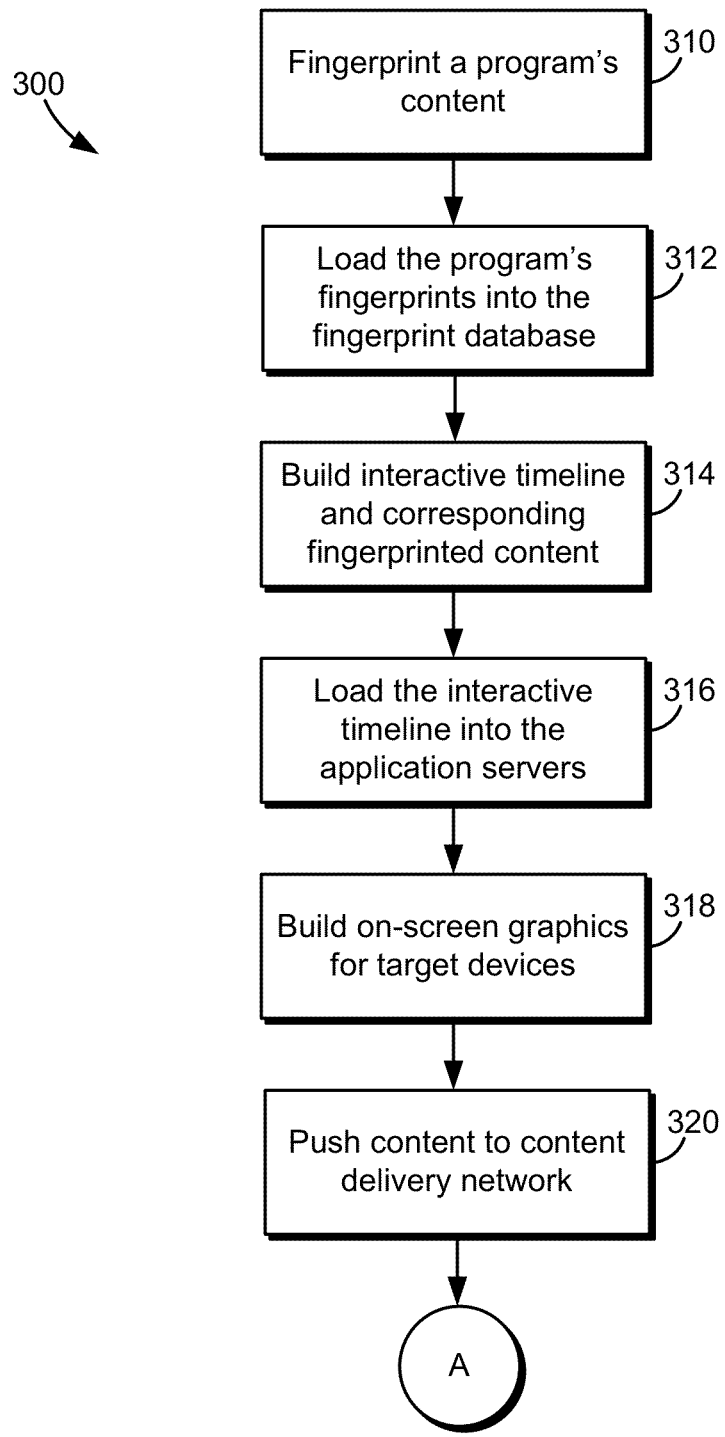
FIGS. 3A-3C are each a flow diagram that illustrates exemplary steps in the operation of an automatic content recognition system in which end-user devices utilize a synchronous event manager for automatic content recognition, in accordance with embodiments of the invention.
Figure 3B:
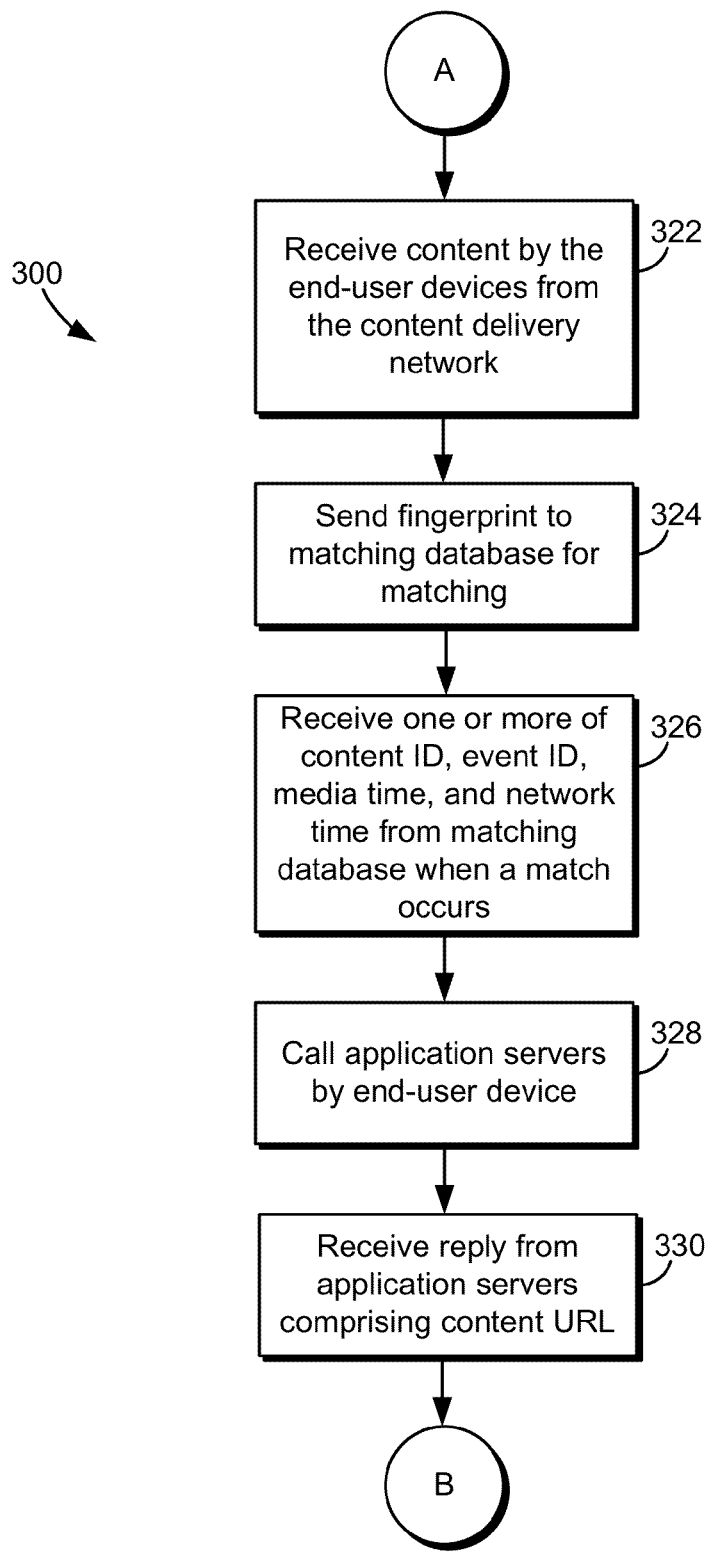
Figure 3C:
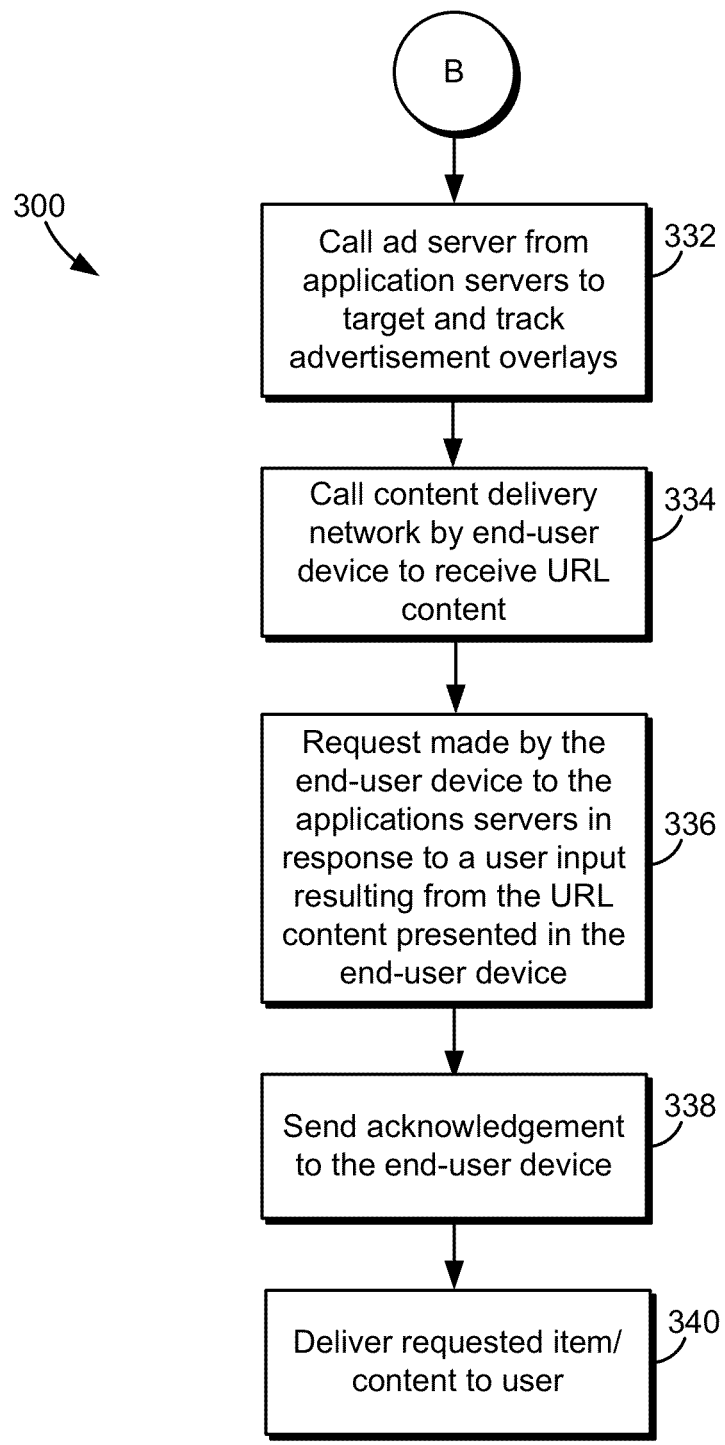

FIGS. 3A-3C are each a flow diagram that illustrates exemplary steps in the operation of an automatic content recognition system in which end-user devices utilize a synchronous event manager for automatic content recognition, in accordance with embodiments of the invention. Referring to FIG. 3A, there is shown a portion of a flow chart 300 in which, at step 310, a program or other type of content may be fingerprinted utilizing a determined fingerprinting technology or computation. The fingerprinting may occur in, for example, the offline fingerprint module 110 shown in FIG. 1.

At step 312, the program's fingerprints may be loaded or stored into a fingerprint database. At step 314, an interactive timeline and corresponding fingerprint content may be built. In this instance, the offline fingerprint module 110 may be utilized to generate an XML file, for example, which may comprise the interactive timeline information. At step 316, the interactive timeline built in step 314 may be loaded or stored into application servers, such as the application data servers 270, for example.

At step 318, on-screen graphics for different target end-user devices (e.g., end-user devices 140, end-user devices 260, . . . , 266) may be built. For example, some of the end-user devices may support Shock Wave Flash or Small Wave Format (SWF) files. This type of files may be utilized in multimedia and vector graphics and may comprise animations or applets with different levels of interactivity and function. In another example, some of the end-user devices may support Hyper Text Markup Language 5 (HTML5), which is a language that allows the structuring and presentation of content in the World Wide Web. At step 320, the content previously fingerprinted in step 310 may be pushed to a content delivery network utilized by the network television station for distribution.

Referring to FIG. 3B, there is shown another portion of the flow chart 300 after step 320. At step 322, the viewer devices may receive the content from the content delivery network and may take fingerprints of the content. At step 324, the viewer devices may send the fingerprints to a third-party database for matching. The third-party database may be part of the fingerprint match systems 130 shown in FIG. 1 or part of the fingerprint vendors 250, . . . , 256 shown in FIGS. 2B and 2C, for example.

At step 326, when a match occurs, the third-party database may return to the end-user devices a combination of a content identifier (CID) that may be representative of the program or network being watch, an interactive event ID that may be representative of an interactive event that is being triggered, a media time that may be representative of a time in the program corresponding to the interactive event, and a network time that may be representative of a benchmark or reference network time such as a network time utilized by an NTP server (e.g., NTP server 120, NTP server 230) to synchronize network operations. The benchmark or reference network time may be referred to as a network timestamp, for example. The information returned to the end-user devices may be monitored by a synchronous event manager running as a background process in those devices.

At step 328, the synchronous event manager in the end-user device may utilize the information received from the third-party database to call application servers such as the application data servers 270. Depending on the type of end-user device (e.g., different manufacturers, models), the call made by the end-user device may comprise different information. For example, for a first device type, the call to the application servers may comprise CID and device type information. In another example, for a second device type, the call to the application servers may comprise the interactive event ID and the device type.

At step 330, the end-user device may receive a reply from the application servers. The reply may comprise a content URL that is appropriate for the type of end-user device. For example, for a first type of viewer device the application servers may return the URL of the SWF, while for a second type of viewer device the application servers may return the URL of an HTML5 page. The application servers may also return event timeline information to the various types of end-user devices. The reply and/or other information returned from the application servers may be handled by the synchronous event manger running on the end-user device.

Referring to FIG. 3C, there is shown another portion of the flow chart 300 after step 330. At step 332, the application servers may call an advertisement server or ad server to target and track advertisement overlays. At step 334, an end-user device may call the content delivery network to receive the content URL. The content delivery network may return the URL for the content, which may be a SWF or HTML page based on the type of viewer device. The call to the content delivery network to receive the content URL may be handled, at least partially, by the synchronous event manager running on the end-user device.

At step 336, the requests made by a user of the end-user device may result in additional step or operations. For example, a user may request a coupon or other type of reward in response to content displayed on the user's viewer device as a result of an interactive event. In this instance, the end-user device may call the application servers as part of the request. At step 338, the application servers may send an acknowledgement or ACK to the end-user device in response to the request. At step 340, the application servers may call an MMS gateway or some other type of fulfillment mechanism to deliver the coupon or reward to the user. The delivery may be made to the end-user device, to another device, to an electronic account (e.g., email, etc.), or to another device/account that the user identifies as a preferred place for receiving the coupon or reward.

Figure 4A:
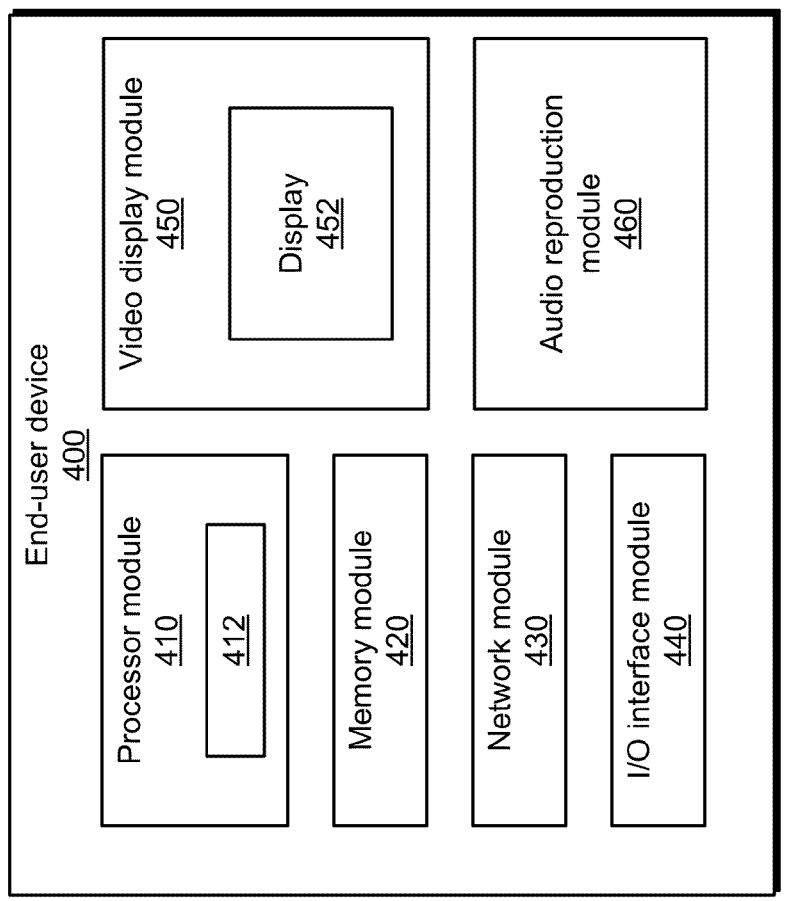
FIG. 4A is a block diagram that illustrates an exemplary end-user device that utilizes a synchronous event manager, in accordance with an embodiment of the invention.

FIG. 4A is a block diagram that illustrates an exemplary end-user device that utilizes a synchronous event manager, in accordance with an embodiment of the invention. Referring to FIG. 4A, there is shown an end-user device 400 that may correspond to one of the end-user devices 140 or one of the end-user devices 260, . . . , 266 described above. The end-user device 400 may comprise a processor module 410, a memory module 420, a network module 430, and an input/output (I/O) interface module 440. The end-user device 400 may also comprise a video display module 450 and an audio reproduction module 460.

The processor module 410 may comprise suitable logic, circuitry, code, and/or interfaces that may be operable to perform the operations, functions, processes, computations, and the like described herein with respect to the end-user devices 140 and the end-user devices 260, . . . , 266. In this regard, the processor module 410 may be operable to enable ACR fingerprinting and ACR-related operations.

The processor module 410 may be operable to run or execute a synchronous event manager as a background process, for example, to monitor events that occur internal to the end-user device 400 and/or events from sources external to the end-user device 400. The synchronous event manager may be executed continuously during those periods where monitoring is to take place. An example of events from external sources may include, but need not be limited to, an overlay event corresponding to an automatic content recognition match. Examples of internal events may include, but need not be limited to, a process, an application, and/or a function corresponding to the automatic content recognition performed by the end-user device 400. In various embodiments of the invention, the synchronous event manager may be implemented in software, firmware and/or hardware. In some instances, the synchronous event manager may be implemented as a state machine. For example, the synchronous event manager may be implemented in a specialized processor or ASIC.

The processor module 410 may comprise at least one processing device 412. The processing device 412 may be a central processing unit (CPU), a digital signal processor (DSP), and/or other type of integrated circuit that may be utilized to perform data processing operations. The processing device 412 may utilize an operating system that enables the execution of the synchronous event manager.

The memory module 420 may comprise suitable logic, circuitry, code, and/or interfaces that may be operable to store information utilized to enable ACR-related applications. The network module 430 may comprise suitable logic, circuitry, code, and/or interfaces that may be operable to allow the end-user device 400 to communicate with a fingerprint vendor and its corresponding RTFS, and/or with the applications data servers 270. The network module 430 may be operable to support one or more communication protocols such as wireline protocols and/or wireless protocols. The network module 430 may be operable to receive information related to ACR fingerprinting matches and/or interactive events.

The I/O interface module 440 may comprise suitable logic, circuitry, code, and/or interfaces that may be operable to enable a user of the end-user device 400 to interact with the device. In some instances, the I/O interface module 440 may enable the interaction of a remote control and/or a second screen (e.g., tablet) with the end-user device 400.

The video display module 450 may comprise suitable logic, circuitry, code, and/or interfaces that may be operable to process video content for reproduction for user consumption. The video display module 450 may comprise a display 452 that may comprise a screen such as a liquid-crystal display (LCD), plasma display, light-emitting diode (LED) display, for example, for video reproduction. In some instances, the display 452 may comprise a touch screen that enables a user to interact with the end-user device 400 through the display 452.

The audio reproduction module 460 may comprise suitable logic, circuitry, code, and/or interfaces that may be operable to process video content for reproduction for user consumption. In some instances, the audio reproduction module 460 may comprise speakers (not shown) for audio reproduction. The audio reproduction module 460 may also be operable to communicate with an audio reproduction system external to the end-user device 400.

In operation, the synchronous event manager may execute or run as a software layer background process on the processor module 410. The synchronous event manager may monitor external events through, for example, the network module 430 and/or internal events through the processor module 410. In response to detected event triggers, the synchronous event manager may request and receive applications, such as user-interaction applications, which may be executed to produce interactive opportunities that may be presented to a user through the display 452, for example.

Figure 4B:
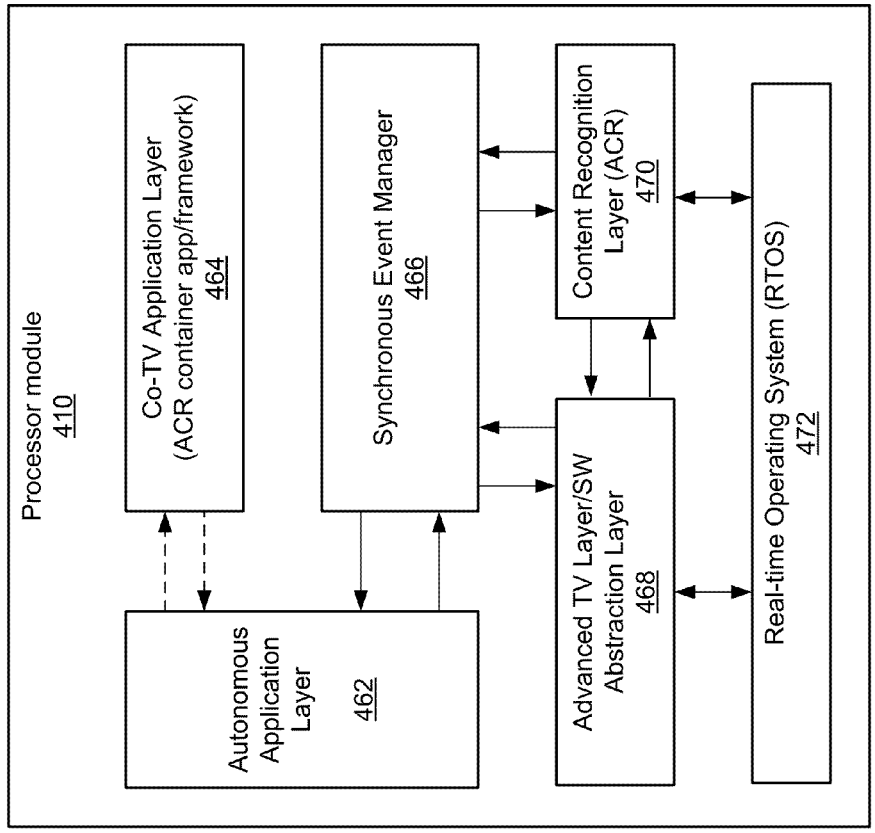
FIG. 4B is a block diagram that illustrates an exemplary processor module, in accordance with an embodiment of the invention.

FIG. 4B is a block diagram that illustrates an exemplary processor module, in accordance with an embodiment of the invention. Referring to FIG. 4B, there is shown an autonomous application layer module 462, a co-TV application layer (ACR container app/framework) module 464, a synchronous event manager 466, an advanced TV layer/software (SW) abstraction layer module 468, a content recognition (ACR) layer module 470 and a real-time operating system (RTOS) module 472.

The autonomous application layer module 462 may comprise suitable logic, circuitry, interfaces and/or code that may be operable to handle TV applications that are not necessarily synchronized to broadcast. For example, the autonomous application layer module 462 may operable to handle a TV widget or native app.

The co-TV application layer (ACR container app/framework) module 464 may comprise suitable logic, circuitry, interfaces and/or code that may be operable to handle application the framework/container (e.g. framework 510), which may be invoked in response to ACR events.

The synchronous event manager 466 may comprise suitable logic, circuitry, interfaces and/or code that may be operable to listen for events passed from the content recognition (ACR) layer 470. The synchronous event manager 466 may be operable to invoke the intended Co-TV application/framework module 464 as defined by event parameters for a given event if there are available resources, for example, graphics plane, and any operating system constraints are also satisfied. An exemplary operating system constrain may be that only a single app is allowed to be executed at a given time. Event parameters such as a callback number may be obtained via multiple requests to an ACR vendor control service.

The synchronous event manager 466 may be operable to supply additional events to applications that have been invoked as necessary. These may or may not be acted upon by the invoked applications (e.g. current timecode of onscreen content, change in content ID, etc). The synchronous event manager 466 may also be operable to supply control information to invoked applications as necessary (e.g. remaining time for an alert message, etc). The synchronous event manager 466 may be operable to teardown an application/framework in response to ACR events comprising, for example, a change in underlying content, expiration of defined duration of an event, channel change, user cancellation or other input.

The synchronous event manager 466 may also be operable to provide dynamic management of ACR state comprising, for example, on-network, off-network, current network, current program. The synchronous event manager 466 may also be operable to modify ACR parameters based on, for example, query rate, in response to the current state. This may aid in reducing the query volume from the TVs to capture service when the TVs are not on a designated network or program with ACR based interactivity. This may dramatically reduce the cost of providing ACR service.

The synchronous event manager 466 may also be operable to dynamically determine freeze frame, blackscreen, fast forward, pause, rewind or other trick mode, channel change modes, and real-time modification of ACR state. The synchronous event manager 466 may be operable to handle these determinations directly or via the content recognition layer (ACR) 470. The synchronous event manager 466 may be operable to receive from and communicate events to autonomous applications, which are handled by the autonomous application layer module 462, as requested, for example, TV widgets. For example, if a NBA TV application is already active, ACR events related to broadcast are passed to the application instead of invoking Co-TV application/framework module 464.

The advanced TV layer/software (SW) abstraction layer module 468 may comprise suitable logic, circuitry, interfaces and/or code that may be operable to provide a software abstraction layer upon which TV widgets or apps may be built and/or developed. The content recognition (ACR) layer module 470 may provide access to TV primitives, that is, stateful to changes to input, video, and so on. In this regard, the advanced TV layer/software (SW) abstraction layer module 468 may be operable to provide SDK functionality.

The content recognition (ACR) layer module 470 may comprise suitable logic, circuitry, interfaces and/or code that may be operable to provide ACR content recognition functionality to the upper layer modules, namely, the autonomous application layer module 462, a co-TV application layer (ACR container app/framework) module 464.

The real-time operating system (RTOS) module 472 may comprise suitable logic, circuitry, interfaces and/or code that may be operable to provide an execution environment for an embedded processor 490. The RTOS may be stored in a memory module such as the memory module 492, which may comprise a ROM module or system-on-chip (SoC) and/or other type of memory such as RAM and variants thereof. Executable RTOS code may read from the memory 492 and executed by the embedded processor 490.

Figure 5A:
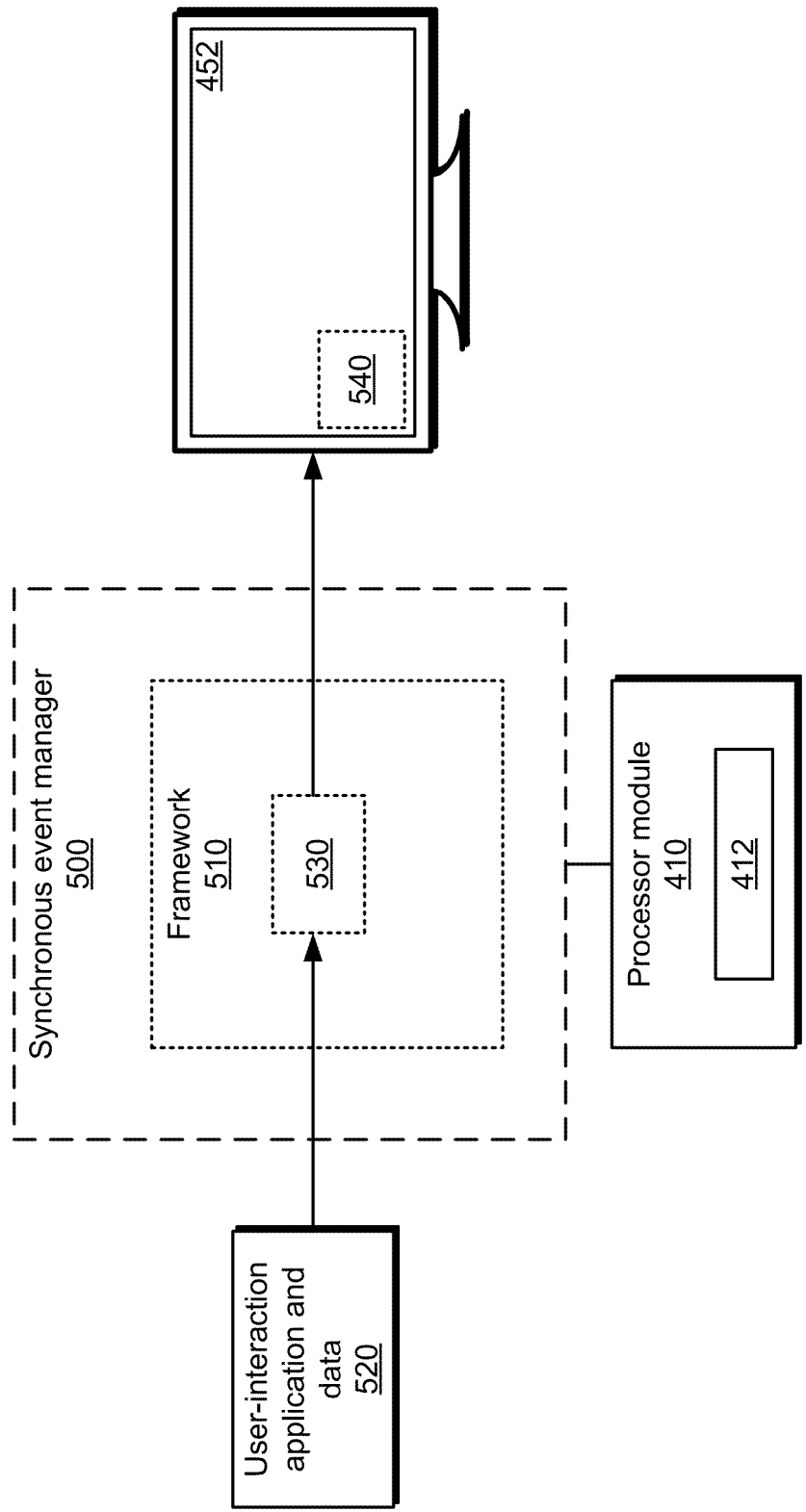
FIGS. 5A and 5B are each a diagram that illustrates an exemplary operation of a synchronous event manager software layer to produce interactive opportunities for users, in accordance with embodiments of the invention.
Figure 5B:
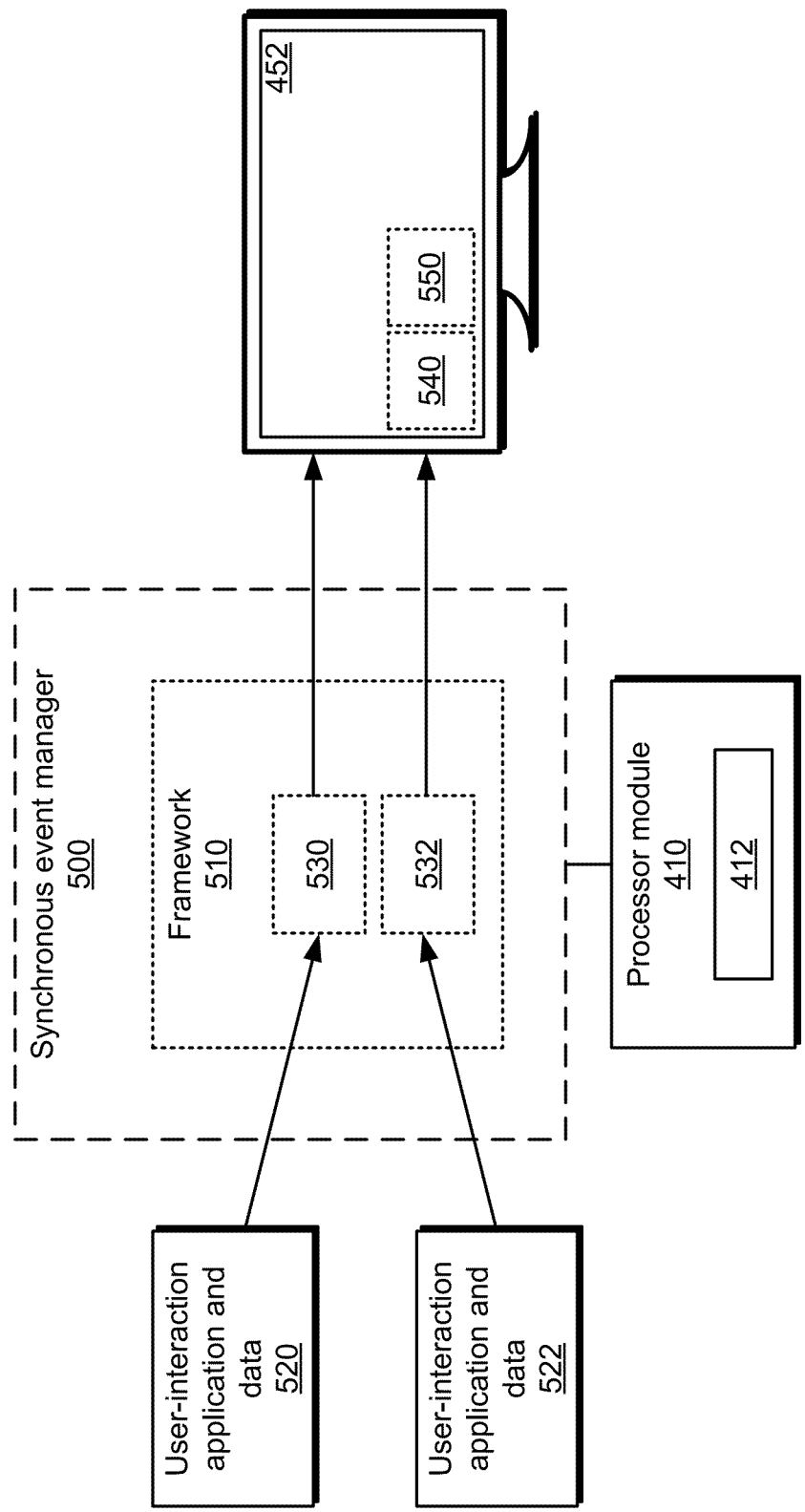

FIGS. 5A and 5B are each a diagram that illustrates an exemplary operation of a synchronous event manager software layer to produce interactive opportunities for users, in accordance with embodiments of the invention. Referring to FIG. 5A, there is shown a synchronous event manager 500 that operates in the end-user device 400 described above. The synchronous event manager 500 may comprise a software layer executed by the processing device 412 in the processor module 410. The synchronous event manager 500 may run as a background process so that it's operation is transparent to the user. By operating as a background process, the synchronous event manager 500 may operate without user intervention.

The synchronous event manager 500 may comprise an environment framework, or engine 510 in which applications may be executed or launched to initiate interaction opportunities. The framework 510 may be empty until an object or application is received for execution or launch. Once the application is no longer needed it may be removed or deleted from the framework 510.

In operation, a user-interaction application and data 520 may be received from, for example, the application data servers 270 shown in FIG. 2B. The user-interaction application and data 520 may be received in response to a request that resulted from an event trigger being detected by the synchronous event manager 500. The user-interaction application and data 520 may be provided to the framework 510 as an object or application 530 to be executed or launched. In the example shown in FIG. 5A, the launch of the object 530 may result in an overlay 540 being displayed on the display 452.

As illustrated by FIG. 5A, the launching of an overlay on the display 452 as a result of an interactive event taking place may occur without the user having to download or install the application related to the interactive opportunity that is presented to the user. Instead, the call or request and the subsequent invocation or launching of the application may occur through the synchronous event manager 500 and are transparent to the user.

Referring to FIG. 5B, an additional user-interaction application and data 522 may be provided to the framework 510 as an object or application 532 to be executed or launched. In the example shown in FIG. 5B, the launch of the object 532 may result in an additional overlay 550 being displayed on the display 452. The overlay 540 and the overlay 550 may be independent from each other or may interact with each other. When the overlays 540 and 550 interact with each other they may do so by interfacing through the framework 510, for example.

As illustrated by FIG. 5B, the single framework 510 in the synchronous event manager 530 may support multiple objects or applications being launch concurrently. In such instances, and when the applications interact with each other, the framework 510 may be utilized to provide an interface for the interaction. Although the term object is utilized herein, the invention is not necessarily limited to object-oriented programming. Accordingly, any other type of programming or implementation may be utilized without departing from the scope of the various embodiments of the invention.

Figure 6:
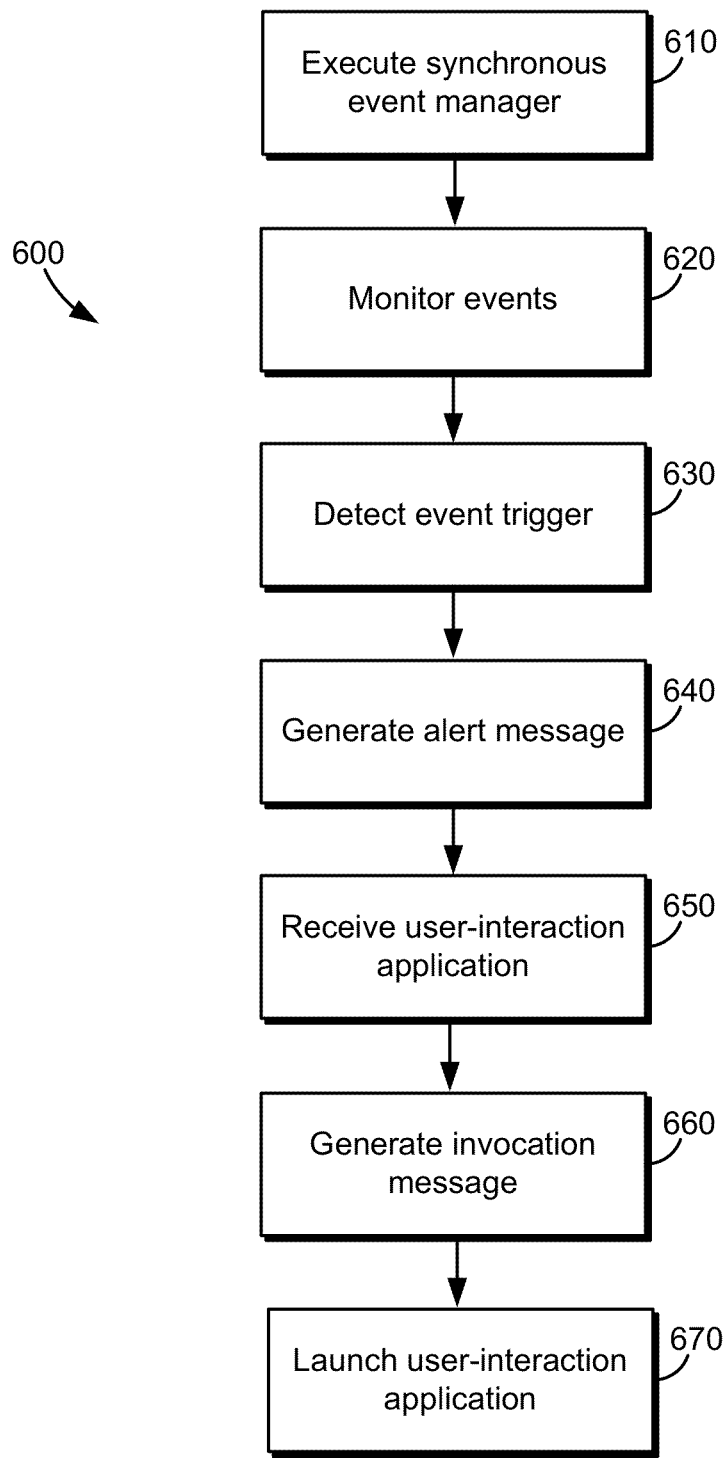
FIG. 6 is a flow chart that illustrates exemplary steps for utilizing a synchronous event manager in an end-user device, in accordance with an embodiment of the invention.

FIG. 6 is a flow chart that illustrates exemplary steps for utilizing a synchronous event manager in an end-user device, in accordance with an embodiment of the invention. Referring to FIG. 6, there is shown a flow chart 600 in which at step 610, a synchronous event manager is executed on a processor of an end-user device. The synchronous event manager may be the synchronous event manager 500 described above, for example. At step 620, the synchronous event manager may monitor events that occur with respect to ACR operations of the end-user device, including but not limited to event triggers and associated data received from a fingerprint matching system or a fingerprint vendor.

At step 630, the synchronous event manager may detect, from the events being monitored, an event trigger and its associated data. At step 640, the synchronous event manager may generate an alert message in response to the detection of the event trigger. At step 650, based on the alert message, a call may be made to an applications data server or to another device to receive a user-interaction application or file. At step 660, after the user-interaction application or file is received by the end-user device, the synchronous event manager may generate an invocation message to launch or execute the application. At step 670, the user-interaction application may be launched from the synchronous event manager to initiate an interactive opportunity for a user.

In another embodiment of the invention, a display device such as the end-user devices 140 or the end-user devices 260, . . . , 266, for example, may be operable to perform automatic content recognition. The display device may be operable to execute a software layer (e.g., synchronous event manager 500) as a background process. The display device may comprise a television or mobile device that is operable to communicate with a data network (e.g., Internet) to receive the user-interaction application.

The software layer may be executed on a processor such as the processor module 410, for example. The software layer may comprise a single container (e.g., framework 510) from which to execute one or more user-interaction applications. The software layer may be utilized to detect an event trigger, where the event trigger may be produced in response to a match resulting from the automatic content recognition operation associated with the display device. The software layer may be operable to receive a user-interaction application corresponding to the detected event trigger and to execute the received user-interaction application from the single container. Moreover, the software layer may be utilized to generate an alert message corresponding to the detection of the event trigger and an invocation message to execute the user-interaction application from the single container.

In another aspect of this embodiment of the invention, the software layer may monitor one or more events to detect the event trigger. The one or more events may comprise one or more events internal to the display device and/or one or more events received by the display device from an external source (e.g., fingerprint matching system, fingerprint vendor). The events received by the display device from the external source may comprise, for example, an overlay event corresponding to an automatic content recognition match. The events internal to the display device may be based on one or more of a process, application, and function corresponding to the automatic content recognition performed by the display device.

In another aspect of this embodiment of the invention, the software layer may generate an overlay (e.g., overlays 540, 550) for reproduction on a screen (e.g., display 520) of the display device when executing the received user-interaction application from the container.

In another aspect of this embodiment of the invention, the software layer may support multiple user-interaction applications. For example, the software layer may be utilized to detect an additional event trigger, may receive an additional user-interaction application in response to the detected additional event trigger, and may execute the received additional user-interaction application from the container while the another received user-interaction application is also being executed from the same container.

In another aspect of this embodiment of the invention, the software layer may be utilized to determine whether user participation with the received user-interaction application is enabled prior to executing the received user-interaction application from the single container.

Another embodiment of the invention may provide a non-transitory machine and/or computer readable storage and/or media, having stored thereon, a machine code and/or a computer program having at least one code section executable by a machine and/or a computer, thereby causing the machine and/or computer to perform the steps as described herein for a synchronous event manager for automatic content recognition.

Accordingly, the present invention may be realized in hardware, software, or a combination of hardware and software. The present invention may be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a display device operable to perform automatic content recognition (ACR):
   detecting an event trigger utilizing a software layer having a single framework, the event trigger being produced in response to a match resulting from the automatic content recognition;
   receiving a user-interaction application corresponding to the detected event trigger; and
   executing the received user-interaction application from the single framework, wherein:
   the single framework comprises a synchronous event manager, the synchronous event manager being operable to:
   invoke the user-interaction application, which is defined by event parameters corresponding to the detected event trigger produced in response to the match resulting from the automatic content recognition;
   dynamically manage state of the automatic content recognition;
   modify ACR parameters corresponding to the automatic content recognition; and
   tear down the invoked user-interaction application automatic content recognition events; and
   the software layer is operable to:

receive an additional user-interaction application in response to a detected additional event trigger; and concurrently execute the received additional user-interaction application from the single framework while the received user-interaction application is also being executed from the single framework.

2. The method of claim 1, comprising generating an overlay for presentation on a screen of the display device when executing the received user-interaction application from the framework.

3. The method of claim 1, comprising monitoring one or more events to detect the event trigger, the one or more events comprising one or more events internal to the display device and/or one or more events received by the display device from an external source.

4. The method of claim 3, wherein the one or more events received by the display device from the external source comprise an overlay event corresponding to an automatic content recognition match.

5. The method of claim 3, wherein the one or more events internal to the display device are based on one or more of a process, application, and function corresponding to the automatic content recognition performed by the display device.

6. The method of claim 1, comprising:
detecting the additional event trigger utilizing the software layer.

7. The method of claim 1, wherein the display device comprises a television that is operable to communicate with a data network to receive the user-interaction application.

8. The method of claim 1, wherein the display device comprises a mobile device that is operable to communicate with a data network to receive the user-interaction application.

9. The method of claim 1, comprising determining whether user participation with the received user-interaction application is enabled prior to executing the received user-interaction application from the single framework.

10. The method of claim 1, comprising:
generating an alert message corresponding to the detection of the event trigger; and
generating an invocation message to execute the user-interaction application from the single framework based on the generated alert message.

11. The method according to claim 1, wherein the synchronous event manager is implemented based on a common reference clock from a single network time server that coordinates the event trigger.

12. The method according to claim 11, wherein the network time server is operable to assign one or more interactive event identifiers to different sets of fingerprints for different fingerprint technologies.

13. The method according to claim 12, wherein the synchronous event manager is operable to monitor the event trigger in the form or one or more interactive event identifiers.

14. The system according to claim 1, wherein the user-interaction application and the additional user-interaction application are invoked in response to the monitoring.

15. A system, comprising:
a display device operable to:
perform automatic content recognition;
detect an event trigger utilizing a software layer having a single framework, the event trigger being produced in response to a match resulting from the automatic content recognition;
receive a user-interaction application corresponding to the detected event trigger; and
execute the received user-interaction application from the single framework, wherein:
the single framework comprises a synchronous event manager, the synchronous event manager being operable to:
invoke the user-interaction application, which is defined by event parameters corresponding to the detected event trigger produced in response to the match resulting from the automatic content recognition;
dynamically manage state of the automatic content recognition;
modify ACR parameters corresponding to the automatic content recognition; and
tear down the invoked user-interaction application automatic content recognition events; and
the software layer is operable to:
receive an additional user-interaction application in response to a detected additional event trigger; and
concurrently execute the received additional user-interaction application from the single framework while the received user-interaction application is also being executed from the single framework.

16. The system of claim 15, wherein the display device is operable to generate an overlay for presentation on a screen of the display device when executing the received user-interaction application from the framework.

17. The system of claim 15, wherein the display device is operable to monitor one or more events to detect the event trigger, the one or more events comprising one or more events internal to the display device and/or one or more events received by the display device from an external source.

18. The system of claim 17, wherein the one or more events received by the display device from the external source comprise an overlay event corresponding to an automatic content recognition match.

19. The system of claim 17, wherein the one or more events internal to the display device are based on one or more of a process, application, and function corresponding to the automatic content recognition performed by the display device.

20. The system of claim 15, wherein the display device is operable to:
detect the additional event trigger utilizing the software layer.

21. The system of claim 15, wherein the display device comprises a mobile device that is operable to communicate with a data network to receive the user-interaction application.

22. The system of claim 15, wherein the display device is operable to determine whether user participation with the received user-interaction application is enabled prior to executing the received user-interaction application from the single framework.

23. The system of claim 15, wherein the display device is operable to:
generate an alert message corresponding to the detection of the event trigger; and
generate an invocation message to execute the user-interaction application from the single framework based on the generated alert message.

24. The system according to claim 15, wherein the synchronous event manager is implemented based on a common reference clock from a single network time server that coordinates the event trigger.

25. The system according to claim 24, wherein the network time server is operable to assign one or more interactive event identifiers to different sets of fingerprints for different fingerprint technologies.

26. The system according to claim 25, wherein the synchronous event manager is operable to monitor the event trigger in the form or one or more interactive event identifiers.

27. The system according to claim 15, wherein the user-interaction application and the additional user-interaction application are invoked in response to the monitoring.

28. A system, comprising:
an automatic content recognition (ACR) enabled television operable to:
execute a software layer as a background process, the software layer having a single framework from which to launch one or more user-interaction applications;
monitor events utilizing the executed software layer;
request a user-interaction application in response to an event trigger detected from the monitored events, the trigger being produced from an ACR-based match; and
launch the received user-interaction application from the single framework, wherein:
the single framework comprises a synchronous event manager, the synchronous event manager being operable to:
invoke the user-interaction application, which is defined by event parameters corresponding to the detected event trigger produced in response to the match resulting from the automatic content recognition;
dynamically manage state of the automatic content recognition;
modify ACR parameters corresponding to the automatic content recognition; and
tear down the invoked user-interaction application automatic content recognition events; and
the software layer is operable to:
detect an additional event trigger;
receive an additional user-interaction application in response to the detected additional event trigger; and
concurrently execute the received additional user-interaction application from the single framework while the received user-interaction application is also being executed from the single framework.

29. The system according to claim 28, wherein the synchronous event manager is implemented based on a common reference clock from a single network time server that coordinates the event trigger.

30. The system according to claim 29, wherein the network time server is operable to assign one or more interactive event identifiers to different sets of fingerprints for different fingerprint technologies.

31. The system according to claim 30, wherein the synchronous event manager is operable to monitor the event trigger in the form or one or more interactive event identifiers.

32. The system according to claim 28, wherein the user-interaction application and the additional user-interaction application are invoked in response to the monitoring.

* * * * *